United States Patent [19]

Hirose

[11] Patent Number: 4,903,184
[45] Date of Patent: Feb. 20, 1990

[54] REACTIVE POWER CONTROLLER

[75] Inventor: Syunichi Hirose, Tokyo, Japan

[73] Assignee: Kabushiki Kaisha Toshiba, Kawasaki, Japan

[21] Appl. No.: 203,140

[22] Filed: Jun. 7, 1988

[30] Foreign Application Priority Data

Jun. 23, 1987 [JP] Japan .................................. 62-154343

[51] Int. Cl.$^4$ ............................................. H02M 5/45
[52] U.S. Cl. ....................................................... 363/37
[58] Field of Search .................. 323/205, 207; 363/35, 363/37, 85, 86, 87, 88

[56] References Cited

U.S. PATENT DOCUMENTS

| 4,328,454 | 5/1982 | Okuyama et al. | 363/37 X |
| 4,330,815 | 5/1982 | Konishi | 363/35 |
| 4,555,750 | 11/1985 | Matsumura et al. | 363/87 X |
| 4,625,272 | 11/1986 | Okuyama et al. | 323/207 X |
| 4,764,859 | 8/1988 | Matsui et al. | 323/207 X |
| 4,843,296 | 6/1989 | Tanaka | 363/37 X |

FOREIGN PATENT DOCUMENTS 0059083 4/1984 Japan .................................. 323/207

Primary Examiner—Patrick R. Salce
Assistant Examiner—Kristine Peckman
Attorney, Agent, or Firm—Foley & Lardner, Schwartz, Jeffery, Schwaab, Mack, Blumenthal & Evans

[57] ABSTRACT

A reactive power controller for a reactive power output from a self-commutated inverter connected to an AC system power source via an AC reactor, the inverter alternatively acting as a capacitor or a reactor, in which an operating unit produces a DC reference voltage for the inverter from a reactive power reference signal and a system power voltage. A differential operation device produces a phase difference angle for the inverter, in which a phase controller outputs firing pulses for controllable rectifier elements of the inverter according to the phase difference angle. An output AC voltage of the inverter is controlled by varying a supply of an active power from the inverter or the system power source to the latter or the former according to the phase difference angle so that the DC voltage of the inverter may be equal to the DC reference voltage.

7 Claims, 2 Drawing Sheets

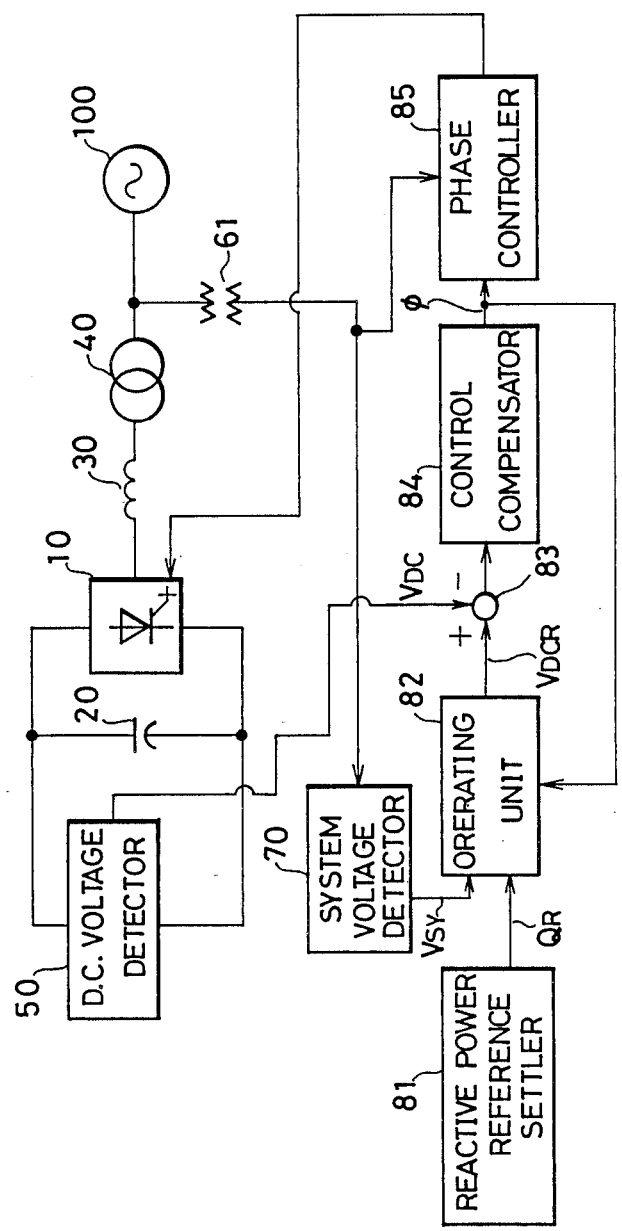

REACTIVE POWER CONTROLLER

BACKGROUND OF THE INVENTION

1. Field of the Invention

The present invention relates to a voltage-controlled reactive power controller for a reactive power output from a self-commutated inverter connected to an AC system power source by controlling an output AC voltage of the self-commutated inverter.

2 Description of the Prior Art

In FIG. 1, there is shown a conventional voltage-controlled reactive power controller comprising an inverter main circuit including an inverter 10 having controllable rectifier elements and a DC capacitor 20 connected thereto in parallel, a coupling reactor 30, a coupling transformer 40, an AC system power source 100 connected to the inverter 10 through the reactor 30 and the transformer 40, a potential transformer, hereinafter referred to as PT, 61 for detecting an AC system voltage to output a system voltage signal, a current transformer, hereinafter referred to as CT, 62 for detecting an AC system current to output a system current signal, a reactive power detector, hereinafter referred to as Q-detector, 63 for detecting a reactive power of the AC system to output a reactive power signal $Q_F$; a reactive power reference settler, hereinafter referred to as Q-reference settler, 81 for outputting a reactive power reference signal $Q_R$, an adder 83 for operating an addition of the signal $Q_F$ and the signal $Q_R$, a control compensator 84 for conducting a control compensation operation such as a proportional integration to obtain a phase difference signal $\phi$, and a phase controller 85 for operating firing timings of firing pulses for the rectifier elements of the inverter 10 so that the phase difference angle between an output voltage $\dot{V}_{IN}$ of the inverter 10 and a system voltage $\dot{V}_{SY}$ of the AC system power source 100 may be $\phi$, to output signals for instructing ON-periods to the rectifier elements of the inverter 10.

A principle of the operation of the conventional reactive power controller shown in FIG. 1 will now be described in connection with FIG. 2. In this case, a conventional reactive power control of a combination of an inverter main circuit 1 including the inverter 10 and the DC capacitor 20 with the AC system power source 100 via the reactor 30 and the transformer 40 is carried out as follows. It is considered that the inverter main circuit 1 is a power source for generating a reactive power Q. In FIG. 2, in fact, the inverter main circuit 1 includes the inverter 10 and the DC capacitor 20, and a coupling impedance 2 having an impedance X represents a combination of the reactor 30 and the transformer 40 because both the reactor 30 and the transformer 40 are considered as impedances.

In FIG. 2a, a current i flows between the inverter main circuit 1 and the system power source 100 through the impedance 2, and the phase difference angle $\phi$ exists between the system voltage $\dot{V}_{SY}$ and the inverter output voltage $\dot{V}_{IN}$. FIG. 2b is a vector diagram when the inverter main circuit 1 acts as a reactor. The amplitude of the inverter output voltage $\dot{V}_{IN}$ is smaller than that of the system voltage $\dot{V}_{SY}$, and a voltage $\dot{V}_{SY}\text{-}\dot{V}_{IN}$ is applied to the impedance 2. The current i having the same phase component as that of the system power source 100 and a phase lag component of 90° with reference to that of the system power source 100, flows through the impedance 2. This means that the inverter main circuit 1 acts as the reactor and receives an active power P from the system power source 100. This relation can be expressed in the following formulas:

$$P = \frac{V_{IN} \cdot V_{SY} \cdot \sin\phi}{X} \quad (1)$$

$$Q = \frac{V_{IN} \cdot V_{SY} \cdot \cos\phi - V_{SY}^2}{X} \quad (2)$$

That is, when the amplitude of the inverter output voltage $\dot{V}_{IN}$ is smaller than that of the system voltage $\dot{V}_{SY}$ and the phase of the inverter output voltage $\dot{V}_{IN}$ is delayed with respect to that of the system voltage $\dot{V}_{SY}$, the inverter main circuit 1 functions as the reactor and receives the active power P from the system power source 100. As apparent from formulas (1) and (2), when the amplitude of the inverter output voltage $\dot{V}_{IN}$ is smaller than that of the system voltage $\dot{V}_{SY}$ and the phase of the inverter output voltage $\dot{V}_{IN}$ is leading with respect to than that of the system voltage $\dot{V}_{SY}$, the inverter main circuit 1 spends the delayed reactive power Q and outputs the active power P to the system power source 100.

In formula (1), when the phase of the inverter output voltage $\dot{V}_{IN}$ is leading that of the system voltage $\dot{V}_{SY}$, the phase difference angle $\phi$ is a positive value and, in turn, when the phase of the inverter output voltage $\dot{V}_{IN}$ is lagging that of the system voltage $\dot{V}_{SY}$, the phase difference angle $\phi$ is a negative value. When the active power P is a positive value, the active power P is supplied from the inverter main circuit 1 to the system power source 100, and, in turn, when the active power P is a negative value, the active power P is supplied from the system power source 100 to the inverter main circuit 1. In formula (2), when the reactive power Q is a positive value, the inverter main circuit 1 acts as a capacitor, and, in turn, when the reactive power Q is a negative value, the inverter main circuit 1 functions as a reactor.

FIG. 2c is a vector diagram when the amplitude of the inverter output voltage $\dot{V}_{IN}$ with reference to that of the system voltage $\dot{V}_{SY}$ satisfies the following formula:

$$V_{IN} > \frac{V_{SY}}{\cos\phi} \quad (3)$$

In this case, the current i having the same phase component as that of the system power source 100 and a phase lead component of 90° with reference to that of the system power source 100, flows through the impedance 2. This means that the inverter main circuit 1 functions as the capacitor and receives the active power P from the system power source 100. Even though formula (3) is satisfied, as is clear from formulas (1) and (2), when the phase difference angle $\phi$ is a positive value, the inverter main circuit 1 acts as the capacitor and supplies the active power P to the system power source 100.

Then, the operation of the conventional reactive power controller for controlling a reactive power Q supplied to the system power source 100, as shown in FIG. 1, will now be described on the basis of the principle described above in connection with FIG. 2.

The reactive power supplied to the system power source 100 is detected as the reactive power signal $Q_F$ output from the Q-detector 63 which receives the system voltage signal and the system current signal from the PT 61 and the CT 62 and operates the reactive power. The reactive power signal $Q_F$ is fed from the Q-detector 63 to the adder 83, and the Q-reference settler 81 outputs the reactive power reference signal $Q_R$ to the adder 83. The adder 83 operates a subtraction of the signal $Q_F$ from the signal $Q_R$ and outputs a signal representing the result of the operation to the control compensator 84. The control compensator 84 operates the phase difference angle $\phi$ and sends it to the phase controller 85. The phase controller 85 receives the phase difference angle $\phi$ and the system voltage signal from the control compensator 84 and the potential transformer 61, respectively, and outputs the ON-period instruction signals to the inverter 10 so that the phase difference angle between the inverter output voltage $\dot{V}_{IN}$ and the system voltage $\dot{V}_{SY}$ $\phi$.

In FIG. 1, when the control compensator 84 outputs the predetermined phase difference angle $\phi$, the inverter 10 outputs a reactive power Q predetermined in the Q-reference settler 81 to the system power source 100. When the reactive power signal $Q_F$ output from the Q-detector 63 is the same as the reactive power reference signal $Q_R$ output from the Q-referenced settler 81, the active power P corresponding to the phase difference angle $\phi$ is supplied from the system power source 100 to the inverter main circuit 1 in accordance with formula (1). That is, the phase difference angle $\phi$ is a negative value, and the active power P corresponding to the phase difference angle $\phi$ is equal to a loss portion of the inverter main circuit 1 because the reactive power settled in the Q-reference settler 81 cannot be output from the inverter 10 to the system power source 100, as hereinafter described in detail.

When the active power P corresponding to the phase difference angle $\phi$ is larger than the loss portion of the inverter main circuit 1, the portion of the active power beyond the loss portion of the inverter main circuit 1 charges the DC capacitor 20, thereby increasing the DC voltage $V_{DC}$ between both the ends of the DC capacitor 20. The relation between the AC voltage $\dot{V}_{IN}$ output from the inverter 10 and the DC voltage $V_{DC}$ of the DC capacitor 20 is expressed in the following formula:

$$V_{IN} = k \cdot V_{DC} \quad (4)$$

wherein k is a fixed number. Therefore, when the DC voltage $V_{DC}$ between both the ends of the DC capacitor 20 increases, an effective value $V_{IN}$ of the inverter AC output voltage increases. Thus, since the reactive power Q output from the inverter 10 is larger than that predetermined in the Q-reference settler 81, the result of the subtraction of the reactive power signal $Q_R$ from the reactive power reference signal $Q_F$ in the adder 83 becomes a positive value. Hence, the input signal of the control compensator 84 has a positive value, and the phase difference angle $\phi$ output from the control compensator 84 becomes a positive value. When the phase difference angle $\phi$ is the positive value, the active power P corresponding to the positive phase difference angle $\phi$ is fed from the inverter 10 to the system power source 100 in accordance with formula (1), and thus the DC voltage $V_{DC}$ between both the ends of the DC capacitor 20 is reduced. Accordingly, the effective value $V_{IN}$ of the inverter output voltage decreases in accordance with formula (4), and then the reactive power Q generated from the inverter 10 is reduced in accordance with formula (2). As described above, when the active power P corresponding to the phase difference angle $\phi$ is not equal to the loss of the inverter main circuit 1, the reactive power corresponding to the reactive power predetermined in the Q-reference settler 81 can be output from the inverter 10.

In the conventional reactive power controller of FIG. 1, three-phase AC voltages of the system power source 100 are seldom balanced or often unbalanced. When the three-phase AC voltages of the system power source 100 are unbalanced, the DC voltage $V_D$ between both the ends of the DC capacitor 20 pulsates with the same frequency as that of a fundamental wave of the system power source 100. Hence, the amplitude of any phase of the output voltages of the inverter 10 differs in its positive and negative sides. In FIG. 3, there are shown three wave forms when the DC voltage $V_D$ between both the ends of the DC capacitor 20 pulsates with the same frequency as the fundamental wave of the system power source 100. That is, FIG. 3a shows one cycle of a pulsation of the DC voltage $V_D$ of the inverter 10 corresponding to the pulsation of the inverter output voltage in one of the three phases. FIG. 3b shows one cycle of a positive component of the inverter output voltage of the one phase, and FIG. 3c shows one cycle of a negative component of the inverter output voltage of the one phase. As shown in FIGS. 3b and 3c, the amplitudes of the positive and negative components of the inverter output voltage of the one phase are unbalanced, and hence the unbalance between the positive and negative components of the inverter output voltage causes a DC current component contained in the AC current flowing through the inverter side of the reactor 30 and the transformer 40 of FIG. 1. This DC current component biases the magnetic fields of the reactor 30 and the transformer 40 and thus causes an overcurrent in the inverter output AC current of the corresponding one phase, with the result of disabling the operation of the inverter 10. This phenomenon cannot be prevented by only controlling the reactive power signal $Q_F$ supplied to the system power source 100 to be coincident with the reactive power reference signal $Q_R$ output from the Q-reference settler 81 by the control compensator 84.

SUMMARY OF THE INVENTION

Accordingly, it is an object of the present invention to provide a reactive power controller for a reactive power output from an inverter, free from the aforementioned disadvantages and defects of the prior art, which is capable of preventing a generation of a DC current component contained in an output AC current of the inverter, biases of magnetic fields in a reactor and a transformer connected to the output of the inverter, and an overcurrent in an output AC current of the inverter, thereby conducting a stable reactive power control.

In accordance with one aspect of the present invention, there is provided a reactive power controller for a reactive power output from a self-commutated inverter having controllable rectifier elements, connected to an AC system power source via an AC reactor, the inverter alternatively acting as a capacitor of a reactor, in which an operating unit produces a DC reference voltage for the inverter from a reference signal of the reactive power to be controlled and a system voltage of the system power source, in which a differential operation device produces a control signal for the inverter by conducting a differential operation between a DC voltage of the inverter and the DC reference voltage, and in which a phase controller compares a phase of the voltage of the system power source with the control signal to output firing pulses for the controllable rectifier elements of the inverter. An output AC voltage of the inverter is controlled by varying a supply of an active power from the invertr or the system power source to the latter or the former via the AC reactor so that the DC voltage of the inverter may be equal to the DC reference voltage, and the variation of the active power supply is controlled by the control signal output from the differential operation device.

BRIEF DESCRIPTION OF THE DRAWINGS

Above and other objects, features and advantages of the present invention will more fully appear from the following description of the preferred embodiments with reference to the accompanying drawings, in which:

FIG. 4 is a block diagram of a voltage-controlled reactive power controller according to the present invention.

DESCRIPTION OF THE PREFERRED EMBODIMENTS

Figure 1:
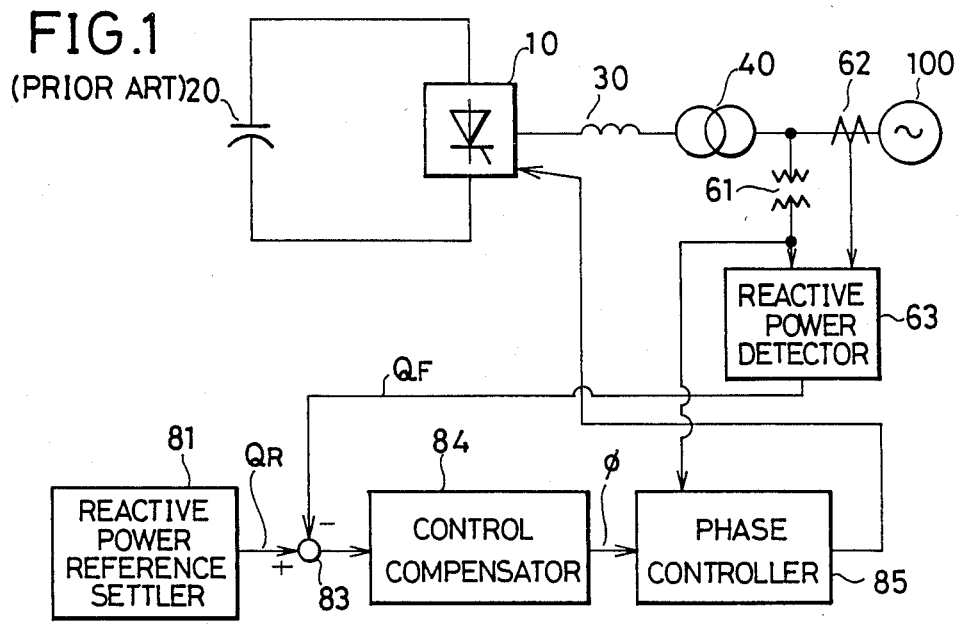
FIG. 1 is a block diagram of a conventional voltage-controlled reactive power controller.
Figure 2:
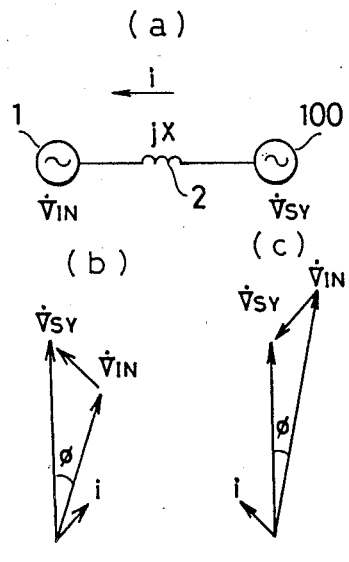
FIGS. 2a, 2b and 2c are schematic diagrams for explaining a principle of an operation of the reactive power controller of FIG. 1.

Referring now to the drawings, wherein like reference characters denote like or corresponding parts throughout the several views, there is shown in FIG. 4 one embodiment of a voltage-controlled reactive power controller for a reactive power output from a self-commutated inverter 10 connected to an AC system power source 100 via an AC reactor according to the present invention.

A DC voltage detector 50 for detecting a DC voltage of an inverter main circuit including the inverter 10 and a DC capacitor 20 is connected in parallel therewith and outputs a DC voltage signal $V_{DC}$ to an adder 83. A system voltage detector 70 for detecting an effective voltage of a system power receives a system voltage signal output from a potential transformer (PT) 61 and outputs an effective voltage signal $V_{SY}$ to an operating unit 82. A reactive power reference (Q-reference) settler 81 outputs a reactive power reference signal $Q_R$ to the operating unit 82, and a control compensator 84 outputs a phase difference angle $\phi$ to the operating unit 82. The operating units 82 operates a DC reference voltage signal $V_{DCR}$ from the effective voltage signal $V_{SY}$, the reactive power reference signal $Q_R$ and the phase difference angle $\phi$ in accordance with the following formula:

$$V_{DCR} = \frac{X \cdot Q_R + V_{SY}^2}{V_{SY} \cdot \cos\phi} \quad (5)$$

wherein X is an impedance of a combination of a coupling reactor 30 and a coupling transformer 40 connected to the output of the inverter 10. Formula (5) can be led from formulas (2) and (4).

The adder 83 operates a subtraction of the DC voltage signal $V_{DC}$ from the DC reference voltage signal $V_{DCR}$ and outputs a signal representing a difference between these two signals $V_{DC}$ and $V_{DCR}$ to the control compensator 84. The control compensator 84 conducts a control compensation operation such as a proportional integration to obtain the phase difference angle $\phi$ and outputs the phase difference angle $\phi$ to a phase controller 85. The phase controller 85 also receives the system voltage signal from the PT 61 and outputs ON-period instruction signals to respective controllable rectifier elements of the inverter 10.

Figure 3:
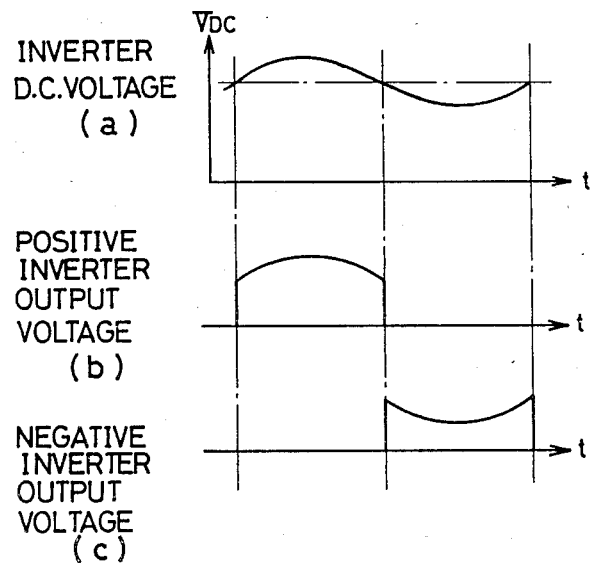
FIG. 3 is a wave form chart for explaining the operation of the reactive power controller of FIG. 1.

In this case, the adder 83 and the control compensator 84 constitute a differential operating means. The operating unit 82 operates the DC reference voltage $V_{DCR}$ which is necessary for the inverter main circuit to generate the reactive power predetermined by the reactive power reference settler 81, and the differential operating means composed of the adder 83 and the control compensator 84 operates the phase difference angle $\phi$ so that the DC voltage signal $V_{DC}$ of the inverter main circuit may be equal to the DC reference voltage $V_{DCR}$. Therefore, even when the DC voltage of the inverter main circuit pulsates with the same frequency as that of a fundamental wave of the system power source 100, as shown in FIG. 3a, this pulsation of the DC voltage of the inverter main circuit can be effectively prevented, and thus the reactive power settled by the Q-reference settler 81 can be output from the inverter 10 without generating biases of magnetic fields of a reactor 30 and a transformer 40 due to a DC current component contained in an AC current of an output system power. That is, the pulsation of the DC voltage of the inverter main circuit is prevented by varying a supply of an active power P from the inverter 10 or the system power source 100 to the system power source 100 or the inverter 10 via the impedance in order to reduce the DC voltage of the inverter main circuit to below the active power corresponding to a loss of the inverter main circuit, and this variation of the active power supply is conducted by adjusting the phase difference angle $\phi$ operated by the control compensator 84 corresponding to the pulsation with the frequency of the fundamental wave of the AC voltage of the system power source 100. The active power P movable between the inverter main circuit and the system power source 100 is determined according to formula (1).

Next, another embodiment of a voltage-controlled reactive power controller according to the present invention will be described. In this embodiment, the construction of the reactive power controller is the same as that of the first embodiment shown in FIG. 4, except that the phase difference angle $\phi$ is not fed from the control compensator 84 to the operating unit 82, that is, an approximation of formula (5) is carried out by assuming that the phase difference angle $\phi$ is always naught. Accordingly, the DC reference voltage signal $V_{DCR}$ is operated in accordance with the simplified following formula:

$$V_{DCR} = \frac{X \cdot Q_R + V_{SY}^2}{V_{SY}} \quad (6)$$

In the second embodiment, only the operation in the operating unit 82 is different from that of the same unit of the first embodiment, and, since $\cos\phi$ is not operated, the operation is simplified, which is advantageous. The DC reference voltage signal $V_{DCR}$ operated by the operating unit 82 in the second embodiment is usually smaller than that of the first embodiment, but the reactive power reference signal $Q_R$ settled in the Q-reference settler 81 can be suitably enlarged in order to compensate the difference between the DC reference voltage signals of the first and second embodiments, with the result of the same effects as those obtained in the first embodiment.

According to the present invention, although the Q-reference settler 81, the operating unit 82, the adder 83 and the control compensator 84 are separately constructed in the preferred embodiments, the functions of these members 81–84 can be replaced with a microcomputer using a programm therefor.

It is readily understood from the above description of the preferred embodiments that according to the present invention, a DC reference voltage $V_{DCR}$ is led from a reactive power reference signal $Q_R$ predetermined by a Q-reference settler 81 and an effective voltage $V_{SY}$ of an AC system power source 100, that a differential operation of the DC voltage $V_{DC}$ of an inverter main circuit with reference to the DC reference voltage $V_{DCR}$ is so carried out in an adder 83 and a control compensator 84 that the DC voltage $V_{DC}$ may be equal to the DC reference voltage $V_{DCR}$, to obtain a control signal for a self-commutated inverter 10, that a phase of the voltage of the system power source 100 is compared with the control signal by a phase controller 85 to output firing pulses for controllable rectifier elements of the inverter 10, and that a pulsation of the DC voltage $V_{DC}$ of the inverter main circuit corresponding to a pulsation of a fundamental wave of the voltage of the system poor source 100 is prevented by controlling an output AC voltage of the inverter by means of the firing pulses in order to remove a DC current component contained in an output AC current of the inverter 10 and to supply a predetermined reactive power to the system power source 100, thereby preventing a generation of biases of magnetic fields in a reactor 30 and a transformer 40 interposed between the inverter 10 and the system power source 100 due to the DC current component contained in the AC current output from the inverter 10.

Although the present invention has been described in its preferred embodiments with reference to the accompanying drawings, it is readily understood that the present invention is not restricted to the preferred embodiments and that various changes and modifications can be made in the present invention by a person skilled in the art without departing from the spirit and scope of the present invention.

What is claimed is:

1. A reactive power controller for a reactive power output from a self-commutated inverter having controllable rectifier elements, connected to an AC system power source via an AC reactor, the inverter alternatively acting as a capacitor or a reactor, comprising:

first means for producing a DC reference voltage for the inverter from a reference signal of the reactive power to be controlled and a system voltage of the system power source to make equal the reactive power output from the inverter to the value of the reference signal of the reactive power;

second means for producing a control signal for the inverter by conducting a differential operation between a DC voltage of the inverter and the DC reference voltage; and third means for comparing a phase of the voltage of the system power source with the control signal to output firing pulses for the controllable rectifier elements of the inverter, in which an output AC voltage of the inverter is controlled by varying a supply of an active power from the inverter or the system power source to the latter or the former via the AC reactor so that the DC voltage of the inverter may be equal to the DC reference voltage, and in which the variation of the active power supply is controlled by the control signal.

2. A controller according to claim 1, wherein the control signal is a phase difference angle of the output voltage of the inverter with reference to the system voltage.

3. A controller according to claim 2, wherein the second means includes an adder for producing a subtraction of the DC voltage of the inverter from the DC reference voltage, and a control compensator which receives the subtraction result from the adder and conducts a control compensation to obtain the phase difference angle.

4. A controller according to claim 3, wherein the third means includes a phase controller for producing firing timings of the firing pulses in accordance with the phase difference angle obtained by the control compensator.

5. A controller according to claim 4, wherein the first means includes an operating unit for producing the DC reference voltage for the inverter from the reactive power reference signal predetermined by a reactive power reference settler and the system voltage detected by a system voltage detector.

6. A controller according to claim 4, wherein the first means includes an operation unit for producing the DC reference voltage for the inverter from the reactive power reference signal predetermined by a reactive power reference settler, the system voltage detected by a system voltage detector and the phase difference angle obtained by the control compensator.

7. A controller according to claim 2, wherein the DC voltage of the inverter is detected by a DC voltage detector connected thereto in parallel.

* * * * *